US008330285B2

(12) United States Patent
Samuel

(10) Patent No.: US 8,330,285 B2
(45) Date of Patent: Dec. 11, 2012

(54) METHOD AND SYSTEM FOR A MORE EFFICIENT AND DYNAMIC WASTE HEAT RECOVERY SYSTEM

(75) Inventor: Woodson Wayne Samuel, Long Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 712 days.

(21) Appl. No.: 12/499,766

(22) Filed: Jul. 8, 2009

(65) Prior Publication Data

US 2011/0006523 A1     Jan. 13, 2011

(51) Int. Cl.
*F02D 29/06*     (2006.01)
(52) U.S. Cl. ............................................. 290/7; 290/43
(58) Field of Classification Search ................. 290/40 C, 290/52, 1 A, 2, 7; 123/2, 3; 60/6, 8, 614
See application file for complete search history.

(56) References Cited

U.S. PATENT DOCUMENTS

| | | | |
|---|---|---|---|
| 3,668,514 A * | 6/1972 | Peck | ................................ 322/28 |
| 3,979,913 A | 9/1976 | Yates | |
| 4,031,705 A | 6/1977 | Berg | |
| 4,201,058 A | 5/1980 | Vaughan | |
| 4,300,353 A | 11/1981 | Ridgway | |
| 4,393,656 A | 7/1983 | Anderson et al. | |
| 4,394,582 A * | 7/1983 | Kreissl et al. | .................. 290/4 C |
| 4,405,029 A | 9/1983 | Hunt | |
| 4,470,476 A | 9/1984 | Hunt | |
| 4,592,436 A | 6/1986 | Tomei | |
| 4,996,845 A | 3/1991 | Kim | |
| 5,000,003 A | 3/1991 | Wicks | |
| 5,008,062 A | 4/1991 | Anderson et al. | |
| 5,176,000 A | 1/1993 | Dauksis | |
| 5,191,766 A | 3/1993 | Vines | |
| 5,228,925 A | 7/1993 | Nath et al. | |
| 5,327,987 A | 7/1994 | Abdelmalek | |
| 5,385,211 A | 1/1995 | Carroll | |
| 5,398,747 A | 3/1995 | Miaoulis | |
| 5,800,631 A | 9/1998 | Yamada et al. | |
| 5,806,332 A | 9/1998 | Shea, Sr. | |
| 5,977,648 A * | 11/1999 | Seffernick et al. | .............. 290/43 |
| 6,202,782 B1 | 3/2001 | Hatanaka | |
| 6,369,316 B1 | 4/2002 | Plessing et al. | |

(Continued)

FOREIGN PATENT DOCUMENTS

JP     2006299858     11/2006

(Continued)

*Primary Examiner* — Tulsidas C Patel
*Assistant Examiner* — Viet Nguyen
(74) *Attorney, Agent, or Firm* — Snell & Wilmer LLP

(57) ABSTRACT

The present invention relates to a method and system for a more efficient and dynamic waste heat recovery system in an automobile. The present invention includes a heat exchanger connected to a generator. The heat exchanger includes variable pitch impellers attached to and rotating a shaft. The pitch of the impellers can be dynamically varied and the impellers can also be staggered. The generator includes a rotor connected to the shaft. The rotor rotates within a stator when the shaft rotates. The stator includes windings with different thicknesses and different turn ratios allowing for generation of different energy levels by each of the windings. Each of the windings can be dynamically activated. The pitch of the impellers can be dynamically altered and the windings can be dynamically activated depending on energy requirements of an energy storage unit and/or accessories in the automobile.

19 Claims, 7 Drawing Sheets

U.S. PATENT DOCUMENTS

| | | |
|---|---|---|
| 6,423,894 B1 | 7/2002 | Patz et al. |
| 6,450,283 B1 | 9/2002 | Taggett |
| 6,536,828 B2 | 3/2003 | Love et al. |
| 6,571,552 B2 | 6/2003 | Ban et al. |
| 6,586,668 B2 | 7/2003 | Shugar et al. |
| 6,729,137 B2 | 5/2004 | Filippone |
| 6,739,389 B2 | 5/2004 | Nakagawa et al. |
| 6,904,766 B2 | 6/2005 | Ito et al. |
| 6,910,333 B2 | 6/2005 | Minemi et al. |
| 6,913,068 B2 | 7/2005 | Togawa et al. |
| 7,056,251 B2 | 6/2006 | Ibaraki |
| 7,104,063 B2 | 9/2006 | Clemens |
| 7,181,919 B2 | 2/2007 | Uno et al. |
| 7,239,034 B2 * | 7/2007 | Gehret, Jr. .................. 290/40 B |
| 7,246,487 B2 | 7/2007 | Hara |
| 7,253,353 B2 | 8/2007 | Stabler |
| 7,309,831 B2 | 12/2007 | Yamada et al. |
| 2003/0182944 A1 * | 10/2003 | Hoffman et al. ................. 60/772 |
| 2005/0012021 A1 | 1/2005 | Middelman et al. |
| 2005/0046195 A1 | 3/2005 | Kousoulis |
| 2005/0133082 A1 | 6/2005 | Konold et al. |
| 2005/0262842 A1 | 12/2005 | Claassen et al. |
| 2006/0207644 A1 | 9/2006 | Robinson et al. |
| 2006/0231235 A1 | 10/2006 | Yamanaka et al. |
| 2007/0101716 A1 | 5/2007 | Tafas |
| 2007/0137851 A1 | 6/2007 | Hamada et al. |
| 2007/0227144 A1 | 10/2007 | Yaguchi et al. |
| 2007/0235164 A1 | 10/2007 | Miyagawa et al. |
| 2007/0245737 A1 | 10/2007 | Inaba et al. |
| 2007/0284087 A1 | 12/2007 | Kohara et al. |
| 2007/0289721 A1 | 12/2007 | Miyagawa et al. |
| 2008/0022681 A1 | 1/2008 | Tafas |
| 2008/0022682 A1 | 1/2008 | Tafas |
| 2008/0034728 A1 | 2/2008 | Tafas |
| 2008/0034729 A1 | 2/2008 | Tafas |
| 2008/0041046 A1 | 2/2008 | Bering |
| 2008/0072583 A1 | 3/2008 | Sakita |
| 2008/0115923 A1 | 5/2008 | Yamanaka et al. |
| 2008/0216480 A1 | 9/2008 | Harmon et al. |
| 2008/0236653 A1 | 10/2008 | Kelly |
| 2010/0205959 A1 * | 8/2010 | Kasuya et al. .................. 60/618 |
| 2010/0329652 A1 * | 12/2010 | Gregg et al. .................. 392/497 |

FOREIGN PATENT DOCUMENTS

| | | |
|---|---|---|
| WO | WO 2007/032801 | 3/2007 |

* cited by examiner

METHOD AND SYSTEM FOR A MORE EFFICIENT AND DYNAMIC WASTE HEAT RECOVERY SYSTEM

BACKGROUND

1. Field of the Invention

The present invention relates to a method and system for a more efficient waste heat recovery system. More specifically, the present invention relates to a method and system for a more efficient and dynamic waste heat recovery system in an automobile.

2. Description of the Related Art

With global energy prices increasing, the cost of operating an automobile for transportation also increases. The cost of operating an automobile may be affected by its weight and also fuel consumption efficiencies. However, traditional automobiles may be overweight and do not fully and efficiently utilize the fuel consumed by the automobile. For example, waste heat in the form of vapor stream may be generated during the consumption of fuel by a motor. Conventional methods and systems have attempted to generate energy from the vapor stream. However such methods and systems may not fully capture the energy potential of the vapor stream where the vapor stream is at certain conditions such as a low velocity. Furthermore, such methods and systems may generate too much energy, requiring that the energy be dissipated by other means, such as through a resistor. This can be problematic with either too little energy being generated or too much energy being generated.

Thus, there is a need for a method and system for a more efficient and dynamic waste heat recovery system in an automobile.

SUMMARY

The present invention relates to a method and system for a more efficient and dynamic waste heat recovery system in an automobile. The present invention includes a heat exchanger in the automobile with variable pitch impellers attached to a shaft. The impellers rotate the shaft which is also connected to a generator. The pitch of the impellers can be dynamically varied to more fully capture the energy from a vapor stream received by the heat exchanger. Thus, the impellers can rotate during a variety of conditions of the vapor stream, such as low velocity conditions. The impellers can also be staggered to more fully capture the energy from the vapor stream and rotate the shaft.

The generator includes a rotor connected to the shaft. The rotor rotates within a stator when the shaft rotates. The stator includes windings with different thicknesses and different turn ratios allowing for generation of different energy levels by each of the windings. Each of the windings can be dynamically activated. The pitch of the impellers can be dynamically altered and the windings can be dynamically activated depending on energy requirements of an energy storage unit and/or accessories in the automobile.

The configuration of the impellers in the heat exchanger and the windings in the generator allows the generator to generate more energy from the vapor stream and also generates an amount of energy which more closely matches the energy requirements of the energy storage unit and/or accessories in the automobile.

In one embodiment, the present invention is an automobile including an engine, a heat exchanger receiving heat from the engine and generating a vapor stream, a vapor stream monitoring unit connected to the heat exchanger, the vapor stream monitoring unit generating vapor stream data, a control unit connected to the vapor stream monitoring unit receiving the vapor stream data, and a generator connected to the control unit and the heat exchanger and receiving the vapor stream. The generator can include a rotor, an impeller rotating the rotor from the vapor stream, and a stator surrounding the rotor, the stator including a first winding and a second winding, wherein the stator generates electricity when the rotor rotate. The present invention also includes a battery receiving the electricity from the generator.

In another embodiment, the present invention is an automobile including an engine, a heat exchanger receiving heat from an engine and generating a vapor stream, a vapor stream monitoring unit connected to the heat exchanger, the vapor stream monitoring unit generating vapor stream data, a control unit connected to the vapor stream monitoring unit receiving the vapor stream data, and a generator receiving the vapor stream from the heat exchanger. The generator can include a rotor, a controllable pitch impeller including a plurality of blades, the controllable pitch impeller rotating the rotor from the vapor stream, and a stator surrounding the rotor, the stator including a first winding, wherein the stator generates electricity when the rotor rotates. The present invention can also include a battery receiving the electricity from the generator.

In yet another embodiment, the present invention is a method for generating electricity in an automobile using a generator including generating a vapor stream using heat from an engine, rotating an impeller using the vapor stream, rotating a rotor surrounded by a stator and connected to the impeller, and generating electricity at a first winding in the stator from the rotation of the rotor within the stator.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
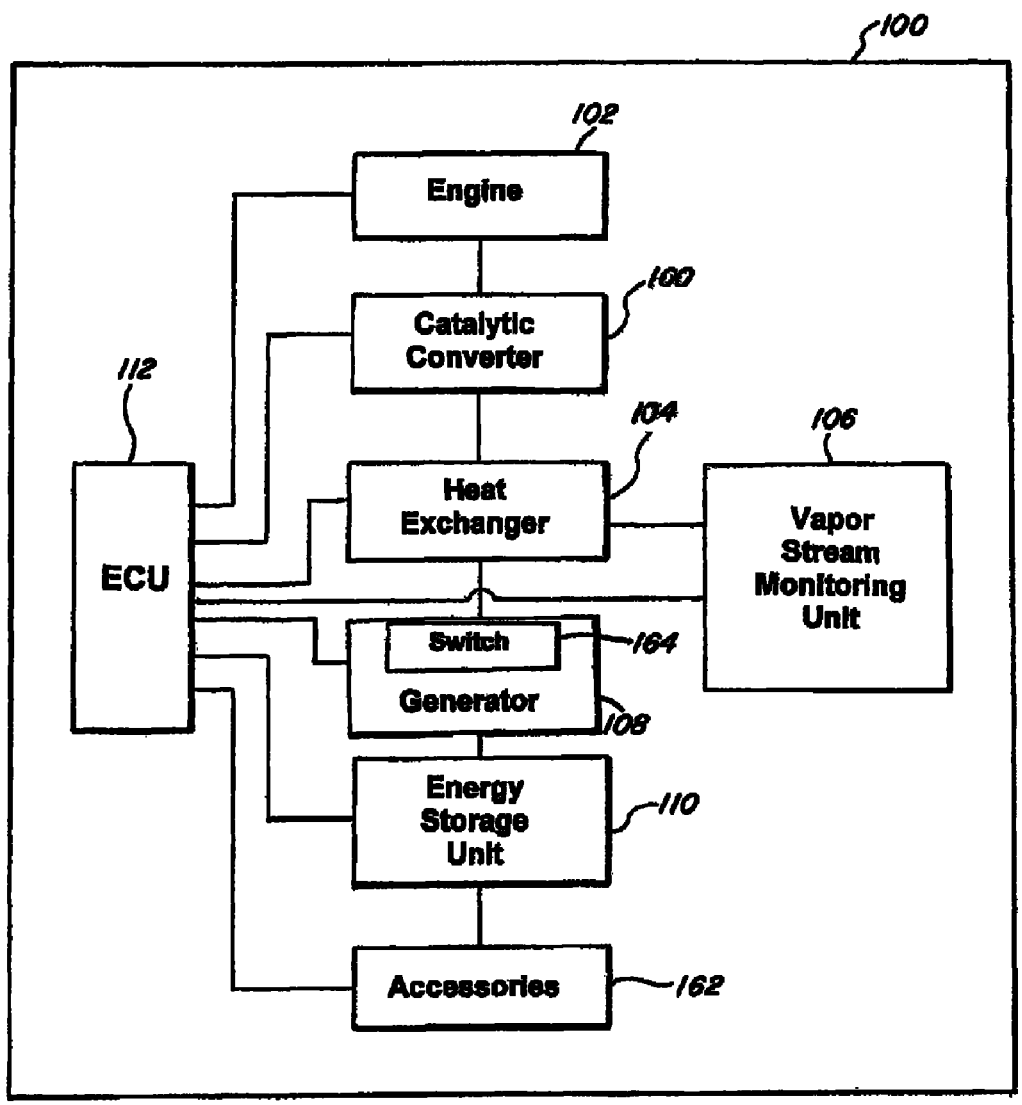
FIG. 1 is a box diagram according to an embodiment of the present invention.

As seen in FIG. 1, the present invention can be embodied in an automobile 100. The automobile 100 can be, for example, a gasoline powered automobile, an automobile with a hybrid engine, a natural gas powered automobile, an ethanol powered automobile, a propane powered automobile, a fossil fuel powered automobile, an automobile with an internal combustion engine, or any other type of automobile with any type of engine. The automobile 100 can include, for example, an engine 102, a heat exchanger 104, a catalytic converter 160, a vapor stream monitoring unit 106, a generator 108, an energy storage unit 110, an engine control unit 112, and accessories 162.

The energy storage unit 110 can be, for example, a battery. The accessories 162 can be, for example, a music player, an air conditioning unit, a headlight, a mobile phone, a personal digital assistant, an electric outlet, a motor, or any other type of equipment or component which requires energy or stores energy. The waste heat from the engine 102 can be used, for example, by the heat exchanger 104 and the generator 108 to generate energy for the energy storage unit 110 and/or the accessories 162.

The engine control unit 112 is connected to the engine 102, the catalytic converter 160, the heat exchanger 104, the vapor stream monitoring unit 106, the generator 108, the energy storage unit 110, and the accessories 162. The engine control unit 112 can control and/or monitor the engine 102, the catalytic converter 160, the heat exchanger 104, the vapor stream monitoring unit 106, the generator 108, and the energy storage unit 110. The engine control unit 112 can also transmit information between each of the components of the automobile 100.

The engine 102 is connected to the heat exchanger 104 and the engine control unit 112. The engine 102 can be, for example, an internal combustion engine, a hydrogen engine, a natural gas engine, an ethanol engine, or any other type of engine sufficient to generate power to move the automobile 100. Once activated engine 102 generates heat during the combustion process and waste air is generated. The waste air from the combustion process is passed to the catalytic converter 160 and can have, for example, a temperature of about 1,600 degrees Fahrenheit. The engine 102 transfers the waste air to the catalytic converter 160.

The catalytic converter 160 is connected to the engine 102 and the engine control unit 112. The catalytic converter 160 receives the waste air from the engine 102 and cleans the waste air to reduce the toxicity of the waste air. This can be accomplished, for example, through chemical reactions. The catalytic converter 160 then transfers the waste air to the heat exchanger 104.

Figure 2:
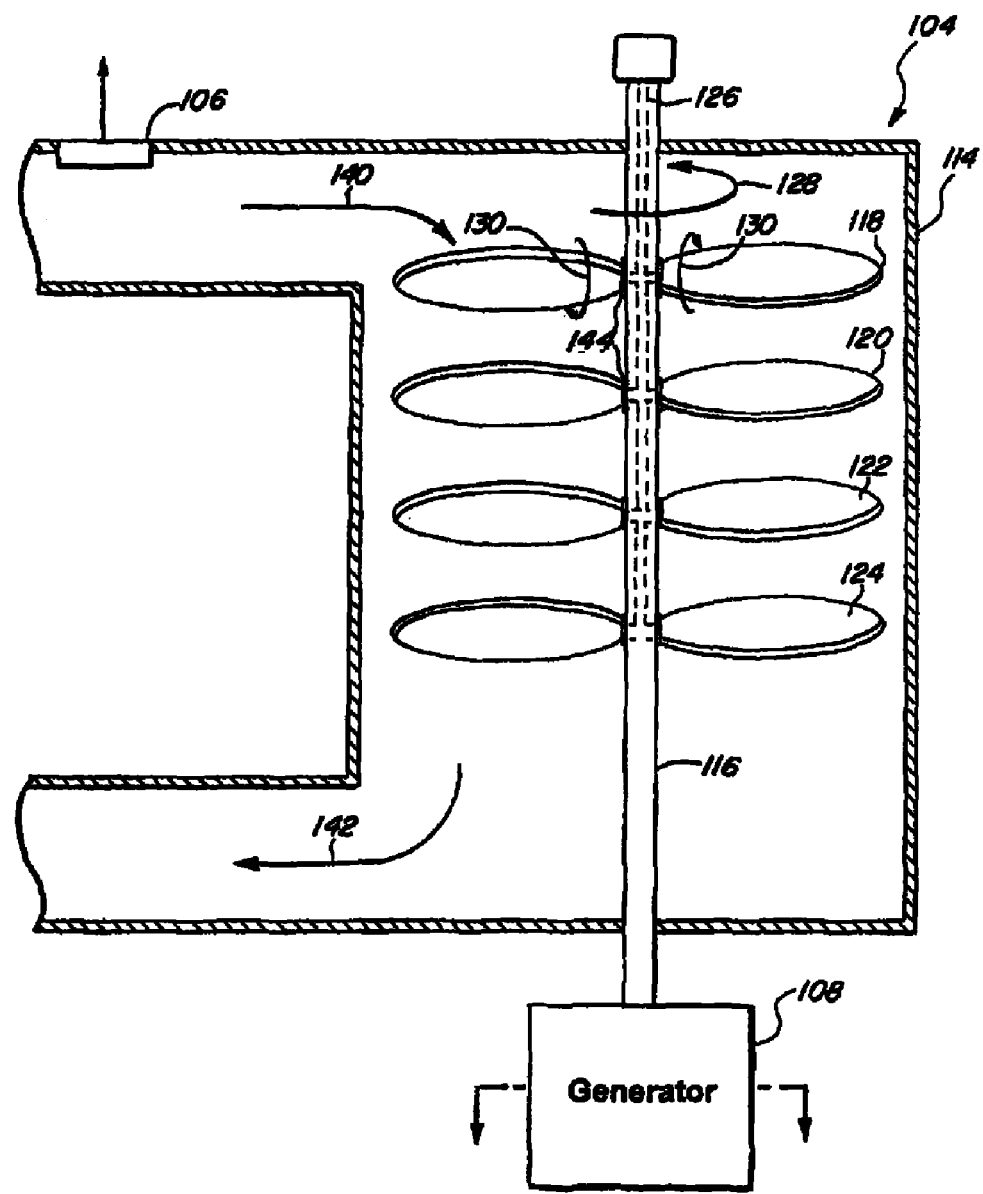
FIG. 2 is a side view of a heat exchanger and a generator according to an embodiment of the present invention.

The heat exchanger 104 is connected to the catalytic converter 160, the vapor stream monitoring unit 106, the generator 108, and the engine control unit 112. As seen in FIG. 2, a vapor stream 140 is received by the heat exchanger 104 from the catalytic converter 160. The vapor stream monitoring unit 106 can monitor the vapor stream 140 to generate vapor stream data which can be transmitted to the engine control unit 112. The vapor stream data can include, for example, a velocity of the vapor stream 140, a temperature of the vapor stream 140, a chemical composition of the vapor stream 140, a pressure of the vapor stream 140, a humidity of the vapor stream 140, and/or any other data that may be useful in determining how to use the vapor stream 140 to generate energy.

The vapor stream 140 is used to rotate impellers 118, 120, 122, and 124 in a direction 128 and exits the heat exchanger 104 as a vapor stream 142. The impellers 118, 120, 122, and 124 are positioned in a housing 114. In FIG. 2, the direction 128 is a counter clockwise direction, but the direction 128 can also be a clockwise direction. Impellers 118, 120, 122, and 124 are connected to shaft 116 which rotates in the direction 128. The shaft 116 is used to operate the generator 108 to generate energy, which will be described below. In one embodiment, the faster the shaft 116 rotates and/or the more torque the shaft 116 produces, the more energy the generator 108 generates. The rotation of the rotational device 144 rotates each of the blades of the impeller 118, to vary the pitch of the impeller 118.

Figure 3:
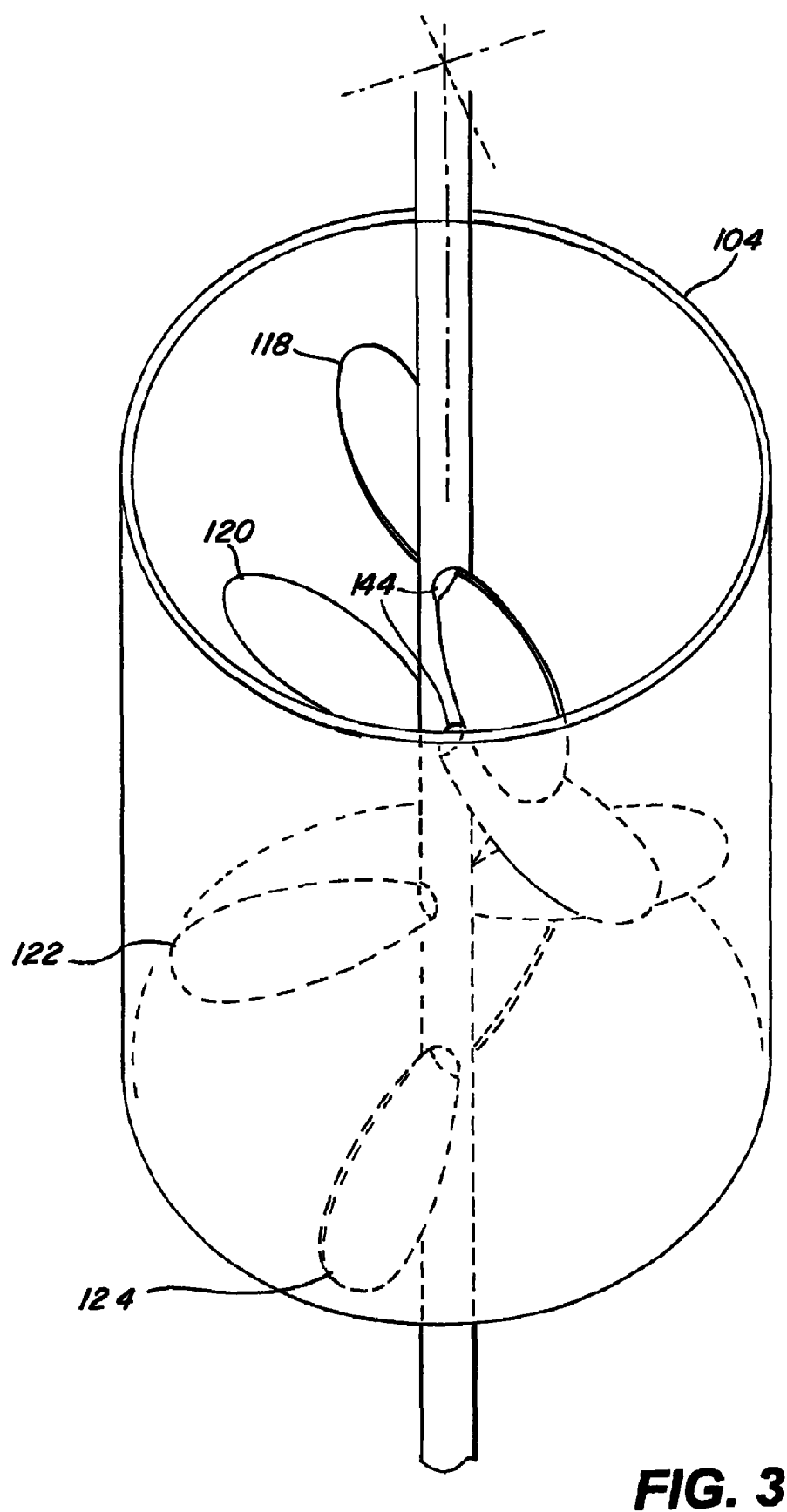
FIG. 3 is a perspective view of a portion of a heat exchanger according to an embodiment of the present invention.
Figure 4:
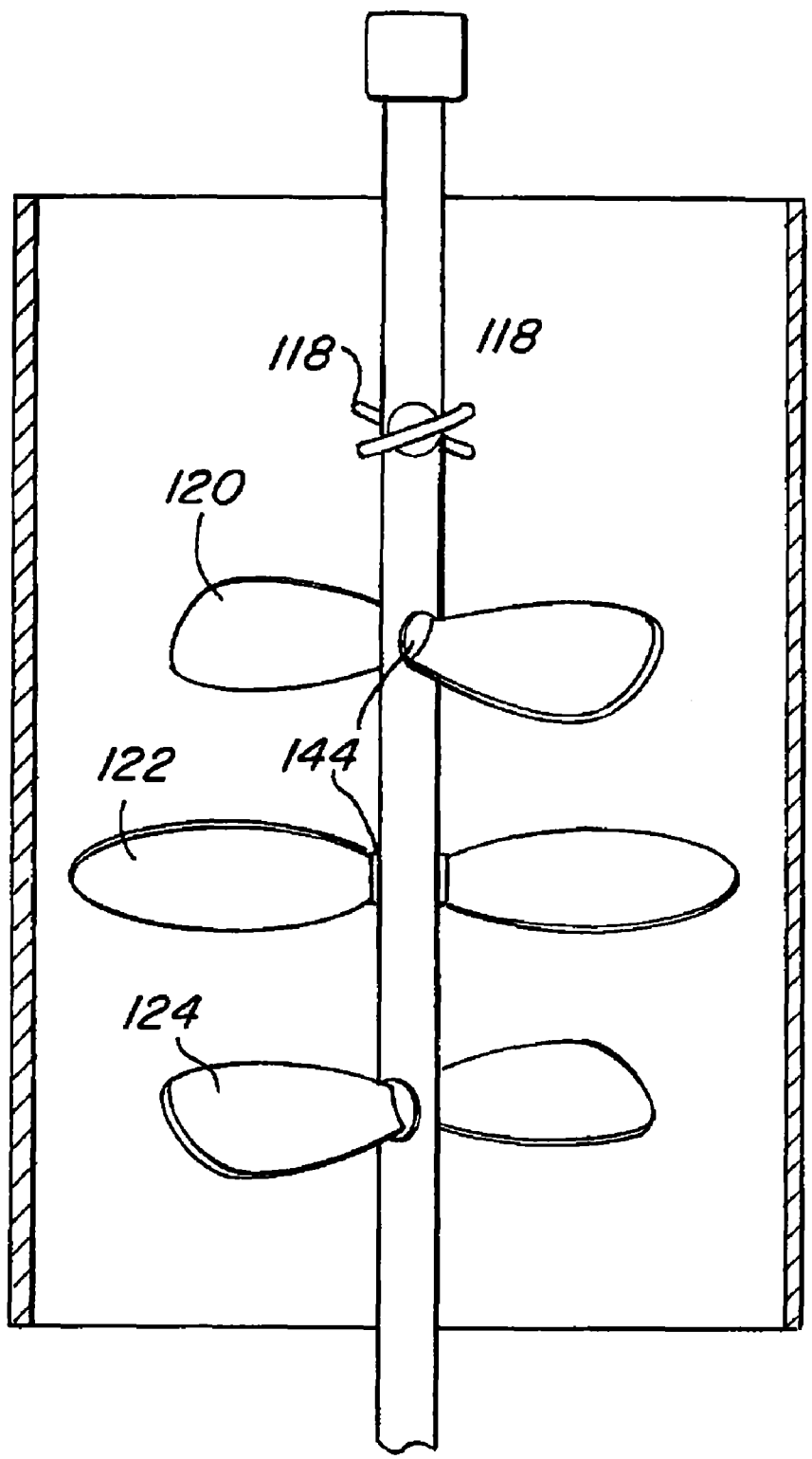
FIG. 4 is a side view of a portion of a heat exchanger according to an embodiment of the present invention.

Although impellers are used in FIG. 2, propellers can also be used. Furthermore, although the impellers 118, 120, 122, and 124 have two blades, three, four, or any number of blades may be used. In one embodiment, the impellers 118, 120, 122, and 124 are staggered as seen in FIG. 3 and FIG. 4. By staggering the impellers 118, 120, 122, and 124, more energy can be captured from the vapor stream 140 through the rotation of the shaft 116. Conventionally, the vapor stream 140 will rotate the impeller 118. If the impeller 120 is placed directly behind the impeller 118, the vapor stream 140 will flow past the impeller 120 without much drag to rotate the impeller 120. Thus, by staggering the impellers 118, 120, 122, and 124, more drag can be generated from the vapor stream 140 to rotate the impellers 120, 122, and 124, and more energy captured from the vapor stream 140. The rotation of the impellers 118, 120, 122, and 124 can be used to rotate the shaft 116 at a higher speed and/or with more torque.

The staggering of the impellers 118, 120, 122, and 124 can be selected to improve the rotational speed and/or the torque of the shaft 116 based upon the operation of the generator 108 and/or the vapor stream 140. The impellers 118, 120, 122, and 124, can also be dynamically staggering and the staggering can be altered in the middle of operation depending on the vapor stream data, the operational requirements of the generator 108, the energy requirements of the energy storage unit 110, and/or the energy requirements of the accessories 162.

The impellers 118, 120, 122, and 124 are variable pitch impellers and each of the blades can rotate in a direction 130 to change the pitch of the impellers 118, 120, 122, and 124. The pitch of the impellers 118, 120, 122, and 124 can be modified by modifying the pitch of the blades of the impellers 118, 120, 122, and 124 using a pitch control system 126. The pitch control system 126 can be, for example, a push-pull system, a magnetic system, a chain system, a motorized system, a mechanized system, a gear system, or any other type of system which can change the pitch of the impellers 118, 120, 122, and 124. Furthermore, each of the blades of the impellers 118, 120, 122, and 124 can have a pitch different from the other blades of the impellers. By varying the pitch of the blades of the impellers 118, 120, 122, and 124, the impellers can be dynamically and strategically positioned to rotate the shaft 116 based upon the vapor stream data, the operational requirements of the generator 108, the energy requirements in the energy storage unit 110, and/or the energy requirements of the accessories 162.

Figure 7:
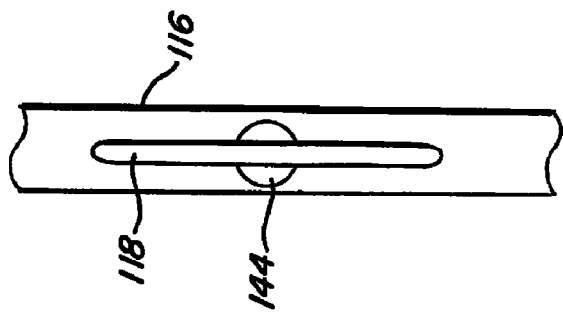
FIG. 7 is a side view of a portion of the heat exchanger according to an embodiment of the present invention.
Figure 6:
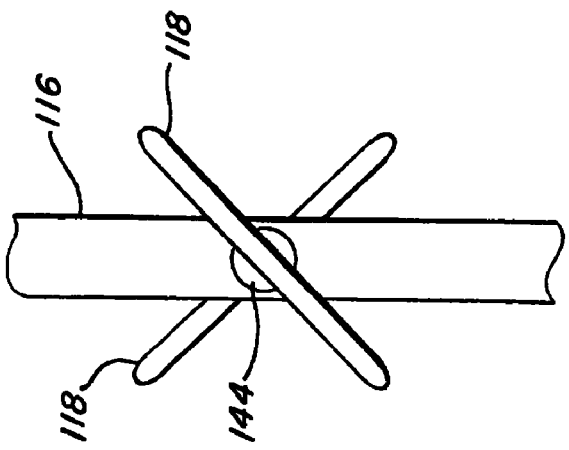
FIG. 6 is a side view of a portion of the heat exchanger according to an embodiment of the present invention.
Figure 5:
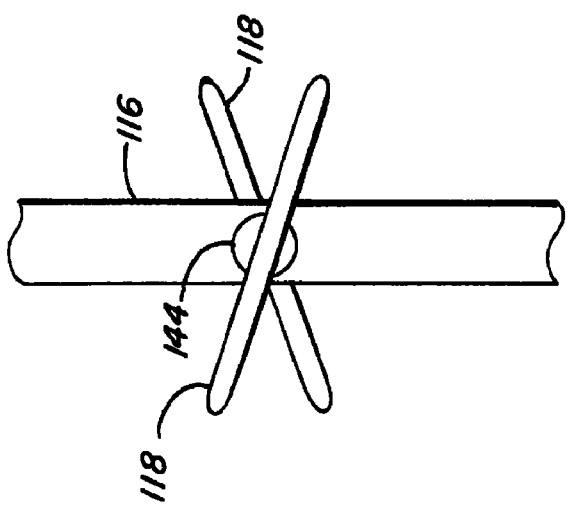
FIG. 5 is a side view of a portion of the heat exchanger according to an embodiment of the present invention.

The pitch of the blades of the impellers, such as the impeller 118, can be varied as shown in FIG. 5, FIG. 6, and FIG. 7. In FIG. 5, FIG. 6, and FIG. 7, the rotation of the rotational device 144 rotates each of the blades of the impeller 118, to vary the pitch of the impeller 118. For example, the pitch of the blades of the impeller 118 can be positioned as shown in FIG. 5 if the vapor stream data indicates a low velocity of the vapor stream 140 and/or the generator 108 requires the shaft 116 to rotate at a low velocity. The pitch of the blades of the impeller 118 can be positioned as shown in FIG. 6 if the vapor stream data indicates a high velocity of the vapor stream 140 and/or the generator 108 requires the shaft 116 to rotate at a high velocity. The pitch of the blades of the impeller can be positioned as shown in FIG. 7 if the vapor stream data indicates a high velocity of the vapor stream 140 and/or the generator 108 requires the shaft 116 to rotate at a low velocity. The pitch of the blades of the impellers 120, 122, and 124 can also be dynamically and strategically positioned at any desired pitch based on the vapor stream data, the operational requirements of the generator 108, the energy requirements in the energy storage unit 110, and/or the energy requirements of the accessories 162.

Figure 8:
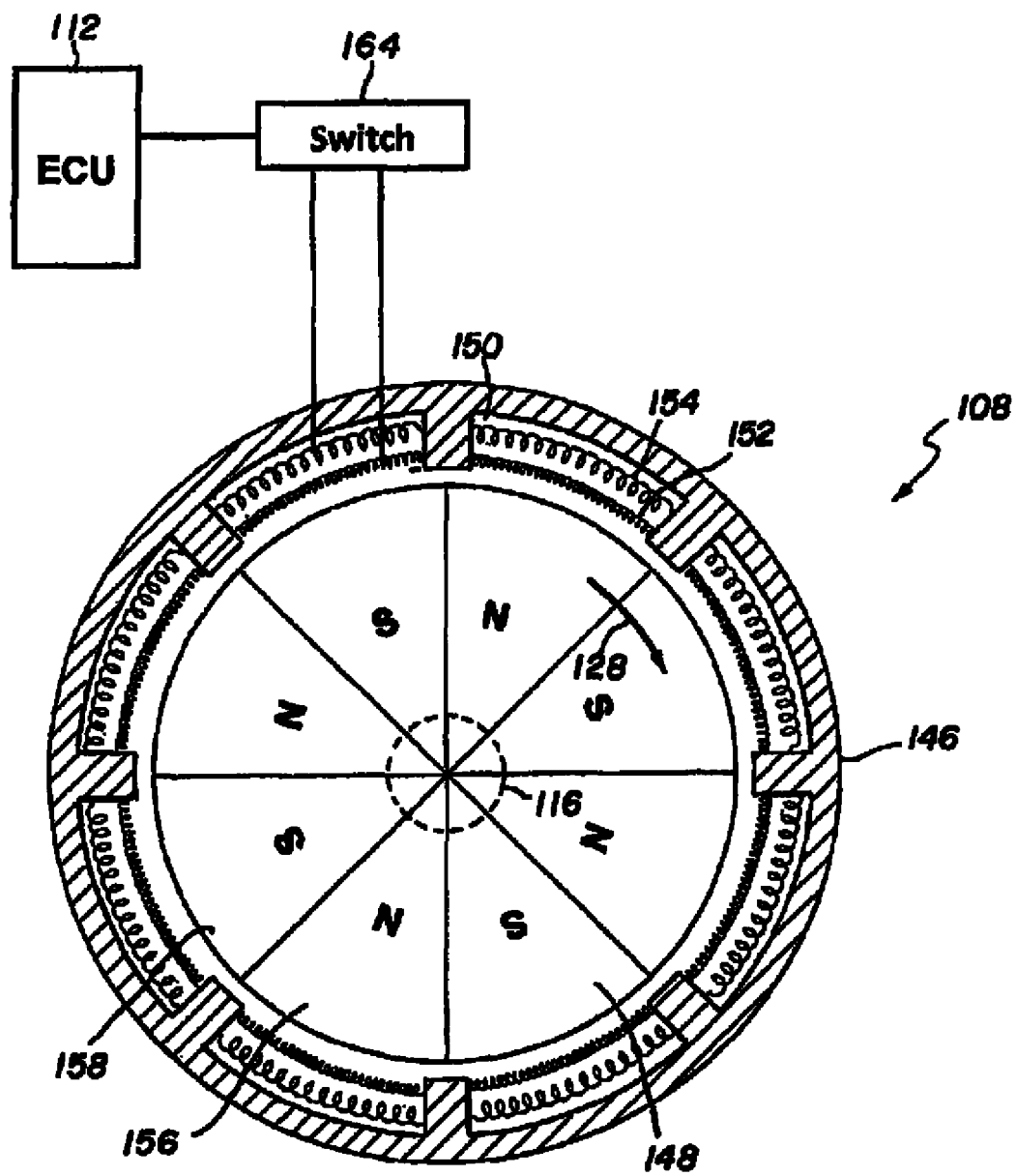
FIG. 8 is a side view of a generator according to an embodiment of the present invention.

FIG. 8 is a side view of the generator 108 taken along the line A-A. The generator 108 includes a rotor 148 connected to a shaft 116 and rotating within a stator 146. When the shaft 116 rotates in the direction 128, the rotor 148 also rotates in the direction 128. The rotor 148 is comprised of a plurality of magnetic sections such as magnetic sections 156 and 158. The magnetic sections alternate polarities. For example, the magnetic section 156 has a north pole while the magnetic section 158 adjacent to the magnetic section 156 has a south pole. The stator 146 has a plurality of grooves 150 in which a winding 152 and a winding 154 reside. The number of grooves 150 can correspond to the number of magnetic sections or any other appropriate number. Furthermore, the size of the grooves 150 can be any size and is not limited to just a particular size. When the rotor rotates, energy can be generated in the winding 152 and/or the winding 154 due to the magnetic flux, depending on whether the winding 152 and/or the winding 154 are activated. The switch 164 is connected to the winding 152 and the winding 154. The ECU 112 is connected to the switch 164.

To activate the winding 152 and/or the winding 154, a switch 164, in the generator 108, can be used as shown in FIG. 1. The switch 164 can be connected to the winding 152 and/or the winding 154. The switch can be a triad alternating current (TRIAC) switch if the current to be generated by the winding 152 and/or the winding 154 is an alternating current (AC). The switch can be a silicon controlled rectifier (SCR) switch if the current to be generated by the winding 152 and/or the winding 154 is a direct current (DC).

The winding 152 can have a smaller thickness than the winding 154 allowing for a larger turn ratio than the winding 154. By having a larger turn ratio, the winding 152 can generate a larger amount of power, such as 120 volts. The winding 154 with its smaller turn ratio can generate, for example, a smaller amount of power such as 12 volts.

The operational requirements of the generator 108 can depend, for example, on the activation of the winding 152 and/or the winding 154 can depend on the rotational speed of the shaft 116, the energy requirements of the energy storage unit 110, and/or the energy requirements of the accessories 162. The operational requirements of the generator 108 may be periodically or constantly updated by the ECU 112.

The winding 152 can be activated, for example, when a large amount of energy is needed by the energy storage unit 110 and/or the accessories 162. Thus, the winding 152 may be activated if the energy storage unit 110 is low and/or the accessories 162 are drawing a large amount of energy. The winding 154 can be activated, for example, when a small amount of energy is needed by the energy storage unit 110 and/or the accessories 162. Thus, the winding 154 may be activated if the energy storage unit 110 is near capacity and/or the accessories 162 are drawing a low amount of energy.

Furthermore, if an amount of energy larger than the amount the winding 152 can provide is required, then the winding 154 can be activated along with the winding 152. Furthermore, the amount of energy generated by the winding 152 and the winding 154 can be controlled by the rotation of the shaft 116 and the pitch of the blades of the impellers 118, 120, 122, and/or 124. The heat exchanger 104 and the generator 108 can cooperate to generate an energy amount required by the energy storage unit 110 and/or the accessories 162.

The cooperation between heat exchanger 104 and the generator 108 allows more energy to be extracted from the vapor stream 140 since dynamically varying the pitch of the blades of the impellers 118, 120, 122, and 124 and/or controlling the activation of the winding 152 and the winding 154 allows energy to be generated from a variety of conditions of the vapor stream 140. Whereas conventional methods and systems may have been unable to generate energy from certain conditions of the vapor stream 140, the heat exchanger 104 and the generator 108 allow energy generation from more conditions of the vapor stream 140. Also, whereas conventional methods and systems may have a reduced energy output during certain conditions of the vapor stream 140, the heat exchanger 104 and the generator 108 more fully captures the energy generation potential from the vapor stream 140.

For example, the pitch of the blades of the impellers 118, 120, 122, and 124 can be dynamically placed in a first position to rotate the shaft 116 when the vapor stream 140 has a low velocity. The pitch of the blades of the impellers 118, 120, 122, and 124 can be dynamically placed in a second position to rotate the shaft 116 when the vapor stream 140 has a high velocity.

Furthermore, the cooperation between the heat exchanger 104 and the generator 108 allow a more accurate amount of energy to be generated since the impellers 118, 120, 122, and 124 and/or the windings 152 and 154 can be dynamically controlled to reduce energy output even when the vapor stream 140 can support higher energy output. This reduces a necessity that a resistor or other device will be used to dump excess energy. With the reduced usage of the resistor, safety can be increased since the temperature of the resister will not be as high.

Figure 9:
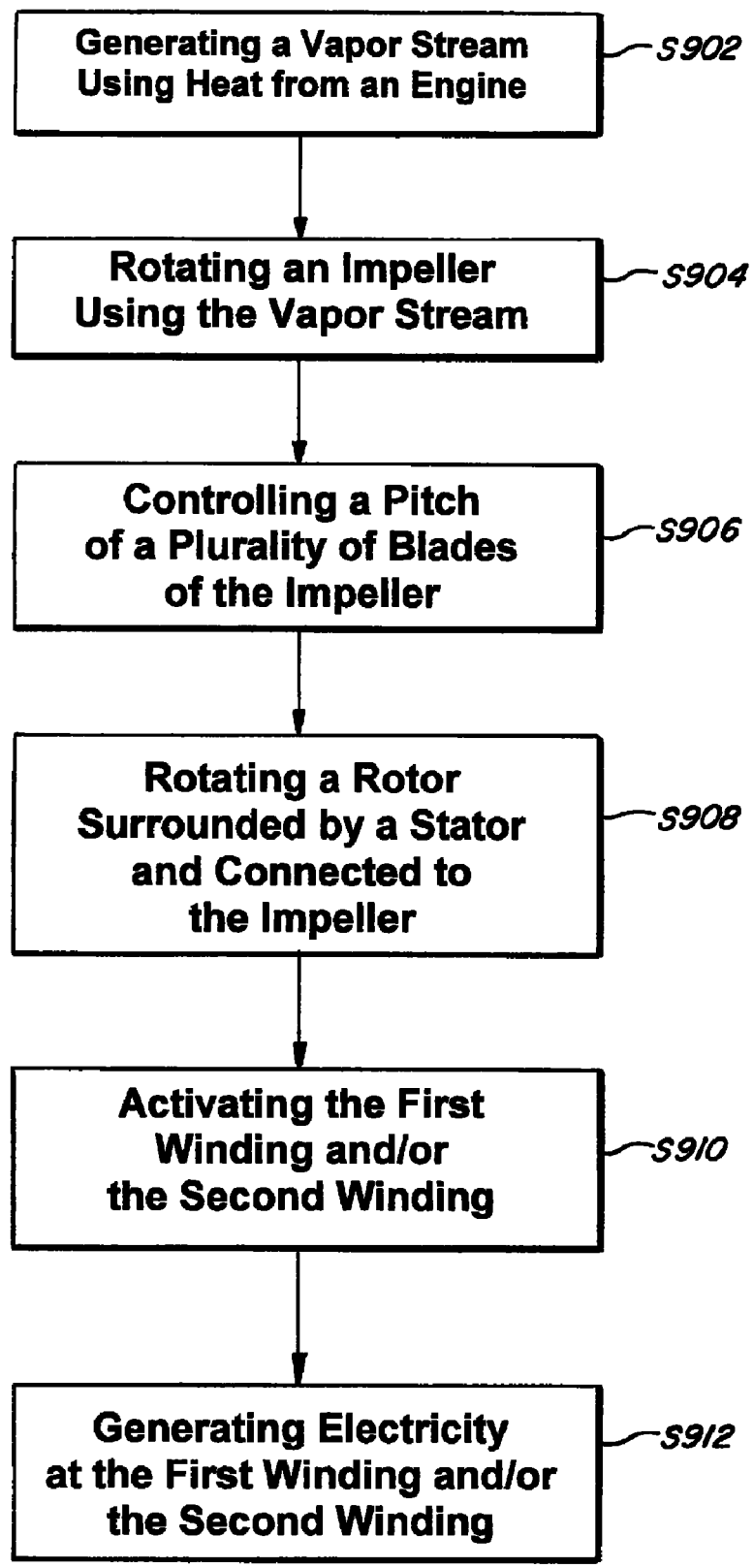
FIG. 9 is a flow chart of a process according to an embodiment of the present invention.

In another embodiment, the present invention can be embodied as a process shown in FIG. 9. In Step S902, a vapor stream is generated using heat from an engine. For example, heat from the engine 102 can be used to generate the vapor 130 as shown in FIG. 2. In Step S904, an impeller can be rotated using the vapor stream. For example, the impellers 118, 120, 122, and/or 124 can be rotated using the vapor stream 140 as shown in FIG. 2.

In Step S906, a pitch of a plurality of blades in the impeller is controlled. For example, the ECU 112 can vary the pitch of the blades of the impellers 118, 120, 122, and/or 124 using the pitch control system 126 as shown in FIG. 2, FIG. 5, FIG. 6, and FIG. 7. In Step S908, a rotor, surrounded by a stator and connected to the impeller, can be rotated. For example, the rotor 148 can be surrounded by a stator 146 as shown in FIG. 8. The rotor 148 can be connected to the impellers 118, 120, 122, and/or 124 by the shaft 116 and can rotate in a direction 128 as shown in FIG. 1, FIG. 2, and FIG. 8.

In Step S910, a first winding and/or a second winding can be activated. For example, the winding 152 and/or the winding 154 in the stator 146 can be activated as shown in FIG. 8. In Step S912, electricity can be generated using the first winding and/or the second winding. For example, the winding 152 and the winding 154 can be used to generate electricity which can be stored in the energy storage unit 110 and/or used by the accessories 162 as shown in FIG. 1, FIG. 2, and FIG. 8.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile comprising:
    an engine;
    a heat exchanger receiving heat from the engine and generating a vapor stream;
    a vapor stream monitoring unit connected to the heat exchanger, the vapor stream monitoring unit generating vapor stream data;
    a control unit connected to the vapor stream monitoring unit receiving the vapor stream data;
    a generator connected to the control unit and the heat exchanger and receiving the vapor stream, the generator including
        a rotor,
        an impeller rotating the rotor from the vapor stream,
        a stator surrounding the rotor, the stator including a first winding and a second winding, wherein the stator generates electricity when the rotor rotates, and
        a switch connected to the first winding and the second winding, the control unit configured to send a signal to the switch to activate the first winding or the second winding based upon the vapor stream data and a desired amount of electricity from the generator; and
    a battery receiving the electricity from the generator.

2. The automobile of claim 1 wherein the switch is a silicon controlled rectifier ("SCR") switch.

3. The automobile of claim 1 wherein the switch is a triode alternating current (TRIAC) switch.

4. The automobile of claim 1 further comprising a catalytic convertor connected between the engine and the heat exchanger.

5. The automobile of claim 1 wherein the impeller is a controllable pitch impeller including a plurality of blades.

6. The automobile of claim 5 wherein a pitch of the blades is controlled by the control unit based upon the vapor stream data.

7. The automobile of claim 5 wherein a pitch of the blades is controlled by the control unit based upon a desired amount of electricity from the generator.

8. An automobile comprising:
    an engine;
    a heat exchanger receiving heat from an engine and generating a vapor stream;
    a vapor stream monitoring unit connected to the heat exchanger, the vapor stream monitoring unit generating vapor stream data;
    a control unit connected to the vapor stream monitoring unit receiving the vapor stream data;
    a generator receiving the vapor stream from the heat exchanger, the generator including
        a rotor,
        a controllable pitch impeller including a plurality of blades, the controllable pitch impeller rotating the rotor from the vapor stream,
        a stator surrounding the rotor, the stator including a first winding, wherein the stator generates electricity when the rotor rotates, and
        an electrical switch connected to the first winding and the second winding, wherein the control unit sends a signal to the electrical switch to activate the first winding or the second winding based upon the vapor stream data and a desired amount of electricity from the generator; and
    a battery receiving the electricity from the generator.

9. The automobile of claim 8 wherein a pitch of the blades is controlled by the control unit based upon the vapor stream data.

10. The automobile of claim 8 wherein a pitch of the blades is controlled by the control unit based upon a desired amount of electricity from the generator.

11. The automobile of claim 8 further comprising a catalytic convertor connected between the engine and the heat exchanger.

12. The automobile of claim 8 wherein the rotor further includes a second winding.

13. The automobile of claim 12 wherein the electrical switch is a silicon controlled rectifier ("SCR") switch.

14. The automobile of claim 12 wherein the electrical switch is a triode alternating current switch (TRIAC) switch.

15. A method for generating electricity in an automobile using a generator comprising:
   generating a vapor stream using heat from an engine;
   rotating an impeller using the vapor stream;
   rotating a rotor surrounded by a stator and connected to the impeller;
   generating electricity at a first winding in the stator from the rotation of the rotor within the stator;
   generating electricity at a second winding in the stator from the rotation of the rotor within the stator; and
   activating the first winding or the second winding using a switch based upon vapor stream data and a desired amount of electricity from the generator.

16. The method of claim 15 wherein the switch is a silicon controlled rectifier (SCR) switch.

17. The method of claim 15 wherein the switch is a triode alternating current (TRIAC) switch.

18. The method of claim 15 further comprising controlling a pitch of a plurality of blades of the impeller based upon a desired amount of electricity from the generator.

19. The method of claim 15 further comprising controlling a pitch of a plurality of blades of the impeller based upon vapor stream data.

* * * * *